United States Patent
Liu

(10) Patent No.: US 8,665,572 B2
(45) Date of Patent: Mar. 4, 2014

(54) BATTERY CHARGE/DISCHARGE PROTECTION CIRCUIT

(75) Inventor: Zutao Liu, Shanghai (CN)

(73) Assignee: Shanghai SIM-BCD Semiconductor Manufacturing Co., Ltd., Shanghai (CN)

( * ) Notice: Subject to any disclaimer, the term of this patent is extended or adjusted under 35 U.S.C. 154(b) by 503 days.

(21) Appl. No.: 12/851,688

(22) Filed: Aug. 6, 2010

(65) Prior Publication Data

US 2011/0287283 A1    Nov. 24, 2011

(30) Foreign Application Priority Data

May 21, 2010  (CN) .......................... 2010 2 0201809

(51) Int. Cl.
*H02H 3/20* (2006.01)
*H02H 9/04* (2006.01)

(52) U.S. Cl.
USPC ............. 361/91.1; 361/91.2; 361/18; 361/15; 320/134; 320/128; 320/135; 320/136; 320/137

(58) Field of Classification Search
USPC ................. 320/136, 134, 128, 135, 127, 137; 429/7; 361/91.1, 91.2, 18, 15
IPC ................................................ H02H 3/20,9/04
See application file for complete search history.

(56) References Cited

U.S. PATENT DOCUMENTS

| | | | | |
|---|---|---|---|---|
| 5,909,103 | A * | 6/1999 | Williams | 320/134 |
| 6,670,790 | B2 * | 12/2003 | Stellberger | 320/134 |
| 2003/0141847 | A1 * | 7/2003 | Fujiwara | 320/134 |

* cited by examiner

Primary Examiner — Basia Ridley
Assistant Examiner — Heng Chan

(57) ABSTRACT

The present invention relates to a battery charge/discharge protection circuit that protects an associated battery from charge/discharge damage. The charge/discharge protection circuit includes a first terminal, a second terminal, a charge over-current detection circuit, a discharge over-current detection circuit, a short circuit detection circuit, and a PMOS transistor. A drain electrode and a gate electrode of the PMOS transistor are connected to the first terminal and the second terminal respectively. A source electrode of the PMOS transistor is connected to the charge over-current detection circuit, the discharge over-current detection circuit and the short circuit detection circuit, such that when a voltage above an overvoltage threshold is supported by the charger, the voltage of the source electrode of the PMOS transistor is maintained above a negative threshold voltage and the elements in these circuits do not receive such a voltage output by the charger.

4 Claims, 4 Drawing Sheets

BATTERY CHARGE/DISCHARGE PROTECTION CIRCUIT

CROSS-REFERENCE TO RELATED APPLICATIONS

This application claims the benefit of Chinese patent application No. 201020201809.8, filed on May 21, 2010, and entitled "A battery recharge/discharge protection circuit".

FIELD OF THE INVENTION

The present invention generally relates to systems and methods for charging and discharging battery systems and, more particularly, to systems and methods for battery charge and discharge protection.

BACKGROUND OF THE INVENTION

Many portable and mobile electronic devices, such as cell phones, personal digital assistants (PDAs), digital cameras, and the like use rechargeable batteries, such as lithium-ion battery systems, that act as a power supply that supply electronic power to these portable and mobile electronic devices. Since lithium-ion and similar battery systems are generally regarded as being somewhat less durable than nickel metal hydride or nickel-cadmium designs, there are some risks with charging and discharging lithium-ion and similar battery systems must be managed. For example, such battery systems can suffer thermal runaway and even cell rupture if being over-charged. Furthermore, over-discharge can reduce the number of charge/discharge cycles within a service life and damage the battery systems.

To reduce these risks, a protection circuit, between the lithium-ion or similar battery and a main part of device, such as a charger or a mobile electronic device, can be provided to a control conditions experienced by the battery system. Theoretically, the protection circuit discontinue the delivery of charge to or draw of charge from the battery system when an overcharge or over-discharge situation is detected. By discontinuing operation of the battery system, the protection circuit is designed to prevent the battery system from being over-charged, where the battery is charged to have a voltage above a charge threshold voltage, and being over-discharged, where the battery is discharged to have a voltage below a discharge threshold voltage.

However, in the charge/discharge protection circuit, some circuit elements for detection of overcharge or over-discharge conditions of the battery, such as MOS transistors, are generally connected directly to the charger components. When an improper charger supplies an excessively large voltage to the battery through the protection circuit, these circuit elements in the protection circuit are subjected to a high electric potential, which may cause damage to these elements of the protection circuit. In such cases, the threshold voltage of the circuit elements used for detecting battery overcharge or over-discharge conditions may be significantly varied. As a result, the characteristics and functions of the circuit elements and the charge/discharge protection circuit may be significantly varied. Using high-voltage resistant circuit elements is one solution provided in prior art to resolve the above-mentioned problem by providing circuit elements that are capable of experiencing high voltages without incurring damage. However, the use of these components comes at the cost of additional chip area and increased manufacturing cost, both costs of which are often considered highly undesirable by consumers looking for highly portable charging devices at commodity prices.

Therefore, it would be desirable to have a system and method for operating a battery charging system having the advantages provided by battery systems such as lithium-ion battery systems without experiencing the drawbacks of being susceptible to damage from over charging or discharging or incurring the manufacturing and/or additional component size costs of traditional protection circuits.

SUMMARY OF INVENTION

The present invention overcomes the aforementioned drawbacks by providing a charge/discharge protection circuit for battery systems such as lithium-ion battery systems that may be susceptible to damage from over charging or discharging without the use of high-voltage resistant elements having associated therewith substantial additional manufacturing costs and circuit-design size costs. Instead, the present invention utilizes a P-channel MOS field-effect transistor ("PMOS transistor") to keep the circuit elements in a charge/discharge protection circuit built with low-voltage resistant elements from experiencing excessively high voltage provided by an abnormal charger. Therefore, the present invention provides a system and method for protecting a battery system from undesirable voltage conditions without incurring substantial overall manufacturing costs above traditional systems or resulting in substantially larger battery charger and protection systems.

In accordance with one aspect of the present invention, a charge/discharge protection circuit configured to protect battery from charge/discharge damage is provided. The charge/discharge protection circuit includes a first terminal configured to be connected to a negative electrode of a charger, a second terminal configured to be connected to a negative electrode of a rechargeable battery, and a charge over-current detection circuit including a plurality of transistors. The charge/discharge protection circuit also includes a discharge over-current detection circuit including a plurality of transistors, a short circuit detection circuit including a plurality of transistors, and a PMOS transistor. A drain electrode of the PMOS transistor is connected to the first terminal and a gate electrode of the PMOS transistor is connected to the second terminal of the charge/discharge protection circuit. A source electrode of the PMOS transistor is connected to the charge over-current detection circuit, the discharge over-current detection circuit, and the short circuit detection circuit. When a voltage above an overvoltage threshold is provided by the charger, the voltage of the source electrode of the PMOS transistor is maintained above a negative threshold voltage, such that the transistors of the charge over-current detection circuit, the discharge over-current detection circuit, and the short circuit detection circuit do not receive the voltage above the overvoltage threshold provided by the charger.

In accordance with another aspect of the invention, a battery pack is disclosed that includes a rechargeable battery and a charge/discharge protection circuit coupled to the rechargeable battery. The charge/discharge protection circuit includes a first terminal, configured to be connected to a negative electrode of a charger, a second terminal, configured to be connected to a negative electrode of a rechargeable battery, a charge over-current detection circuit including a plurality of transistors, a discharge over-current detection circuit including a plurality of transistors, a short circuit detection circuit including a plurality of transistors, and a PMOS transistor. A drain electrode of the PMOS transistor is connected to the first terminal and a gate electrode of the PMOS transistor is connected to the second terminal of the charge/discharge protection circuit. A source electrode of the PMOS transistor is connected to the charge over-current detection circuit, the discharge over-current detection circuit and the short circuit detection circuit. When a voltage above an overvoltage threshold is supported by the charger, the voltage of the source electrode of the PMOS transistor is maintained above a negative threshold voltage, such that the transistors of the charge over-current detection circuit, the discharge over-current detection circuit and the short circuit detection circuit do not receive the voltage above the overvoltage threshold output by the charger.

The foregoing and other aspects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention.

DETAILED DESCRIPTION

Figure 1:
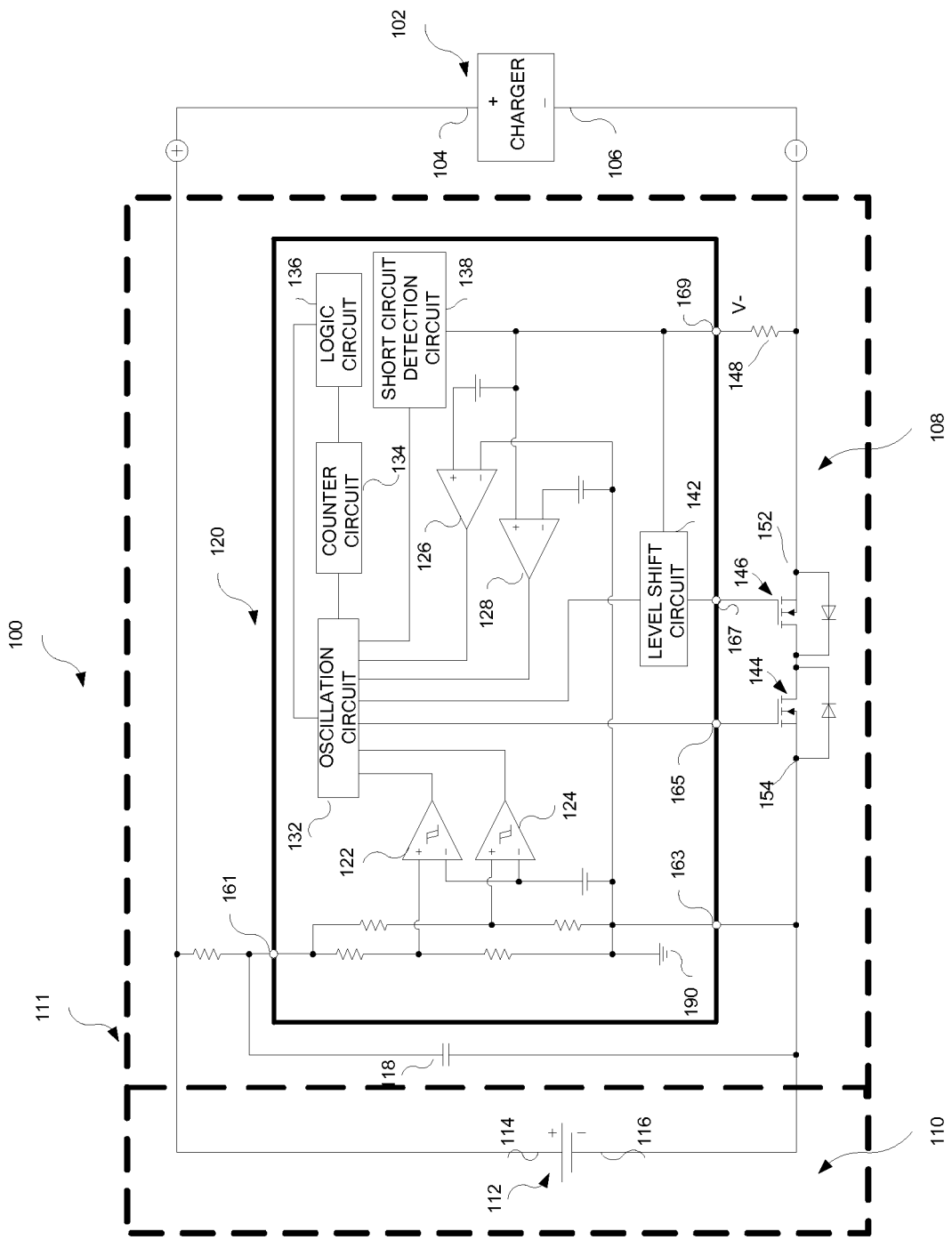
FIG. 1 is a circuit diagram showing a prior-art battery protection system including a battery charge/discharge protection circuit.

FIG. 1 is a circuit diagram showing a prior-art battery system 100 including a charger 102, a battery protection system 108, and a battery pack 110. As illustrated, the battery pack 110 and battery protection system 108 may be coupled together, such as in a common housing 111. However, in other configurations, the battery pack 110 may be removably engaged with the battery protection system 108. When the charger 102 is connected to the battery pack 110, a rechargeable battery 112 is being charged; when a mobile electronic device is connected to the battery pack 110, the rechargeable battery 112 is, generally, being discharged.

In FIG. 1, the battery pack 110 includes a rechargeable battery 112 with a positive electrode 114 and a negative electrode 116. The battery protection system 108 includes a capacitor 118, a charge control transistor 146, a discharge control transistor 144, and a charge/discharge protection circuit 120. A source electrode of the charge control transistor 146 is a first terminal 152 of the protection circuit 120, and a drain electrode of the discharge control transistor 144 is a second terminal 154 of the protection circuit 120.

When the battery 112 is being charged, the negative electrode 106 of the charger 102 is connected to the first terminal 152, the negative electrode 116 of the battery 112 is connected to the second terminal 154, and the positive electrode 104 of the charger 102 is connected to the positive electrode 114 of the battery 112.

The battery charge/discharge protection circuit 120 includes an overcharge detection circuit 122, an over-discharge detection circuit 124, a charge over-current detection circuit 126, a discharge over-current detection circuit 128, an oscillation circuit 132, a counter circuit 134, a logic circuit 136, a short circuit detection circuit 138, and a level shift circuit 142. In the configuration shown in FIG. 1, the charge/discharge protection circuit 120 has five input/output terminals: terminal 161, terminal 163, terminal 165, terminal 167, and terminal 169. The electric potential of the terminal 161 to the terminal 163 is equal to the voltage supplied by the battery 112, $V_{161}-V_{163}=V_{battery}$. The electric potential of the terminal 161 to the terminal 169 is equal to the voltage supplied by the charger 102, $V_{161}-V_{169}=V_{charger}$. If an excessive voltage is supplied by the charger 102 to the battery pack 110, the potential of terminal 169 is lower than the potential of the terminal 163, since the positive electrode 104 of the charger 102 and the positive electrode 144 of the battery 112 are both connected to the terminal 161, $V_{163}-V_{169}=V_{charger}-V_{battery}$.

The maximum charging voltage, the voltage that a battery reaches when it is fully charged, for a commonly used lithium-ion battery is, for example, 4.25 V. When an voltage attempting to be supplied to the battery 112 is detected to be higher than this maximum voltage, the charger/discharge protection circuit 120 turns off the charge control transistor 146 to cut off the connection between the negative electrode 106 of the charger 102 and the negative electrode 116 of the battery 112. As a result, there is no charging current flowing from the charger 102 to the battery 112.

In the situation when the charge control transistor 146 is in an OFF state, the second terminal 154 is connected to the terminal 165 of the charge/discharge protection circuit 120. At the same time, the discharge control transistor 144 is also turned off due to the OFF state of the charge control transistor 146 and the first terminal 152 is connected to the terminal 167 of the charge/discharge protection circuit 120. In other words, when the protection circuit 120 cuts off the charger from the charger, first terminal 152 and second terminal 154 work as the output terminals of the protection circuit 120. Therefore, the electric potential of first terminal 152 to the second terminal 154 is the voltage difference between the voltage of the battery 112 and the charger 102, $V_{152}-V_{154}=V_{battery}-V_{charger}$. For example, if the voltage supplied by the charger is 5 V, when the battery 112 is fully charged and reaches the maximum voltage, for example, 4.25 V, the charge/discharge protection circuit 120 will cut off the connection between the charger 102 and the battery 112 to protect the battery from being steadily subjected to the high voltage supplied by the charger 114. Also, the voltage between the first terminal 152 of the protection circuit 120 and the second terminal 154 is −0.75 V. If the voltage supplied by the charger is 28 V, the voltage between first terminal 152 and second terminal 154 is −23.75 V.

It should be noted that the terminal 163 and the circuit elements of the protection circuit 120 connected to the terminal 163 are protected from being subjected to high voltages supplied by an improper charger 102. Similarly, the terminal 165 and the circuit elements of the protection circuit 120 connected to the terminal 165 are not subjected to high voltages supplied by an improper charger 102. However, the terminal 167 and terminal 169 are subjected to the high voltage supplied by the improper charger 114 and, therefore, high-voltage resistant structure is needed for the circuit elements connected to the terminal 167 and terminal 169.

As shown in FIG. 1, the charge over-current detection circuit 126, the discharge over-current detection circuit 128, and the short circuit detection circuit 138 are connected to the terminal 169. As discussed above, since the terminal 169 is subjected to the high voltage supplied the charger 114, high-voltage resistant transistors are needed in the above-mentioned three circuits as input transistors to receive the voltage from the terminal 169. For practical applications, however, high-voltage resistant transistors usually have a substantially large overall size, which results in a relatively large chip area to built at increased manufacturing costs. Further, exposing these input transistors to high-voltage electric fields will also cause a change in their threshold voltage and eventually damage the detection precision of the charge over-current detection circuit 126, the discharge over-current detection circuit 128, and the short circuit detection circuit 138.

Figure 2:
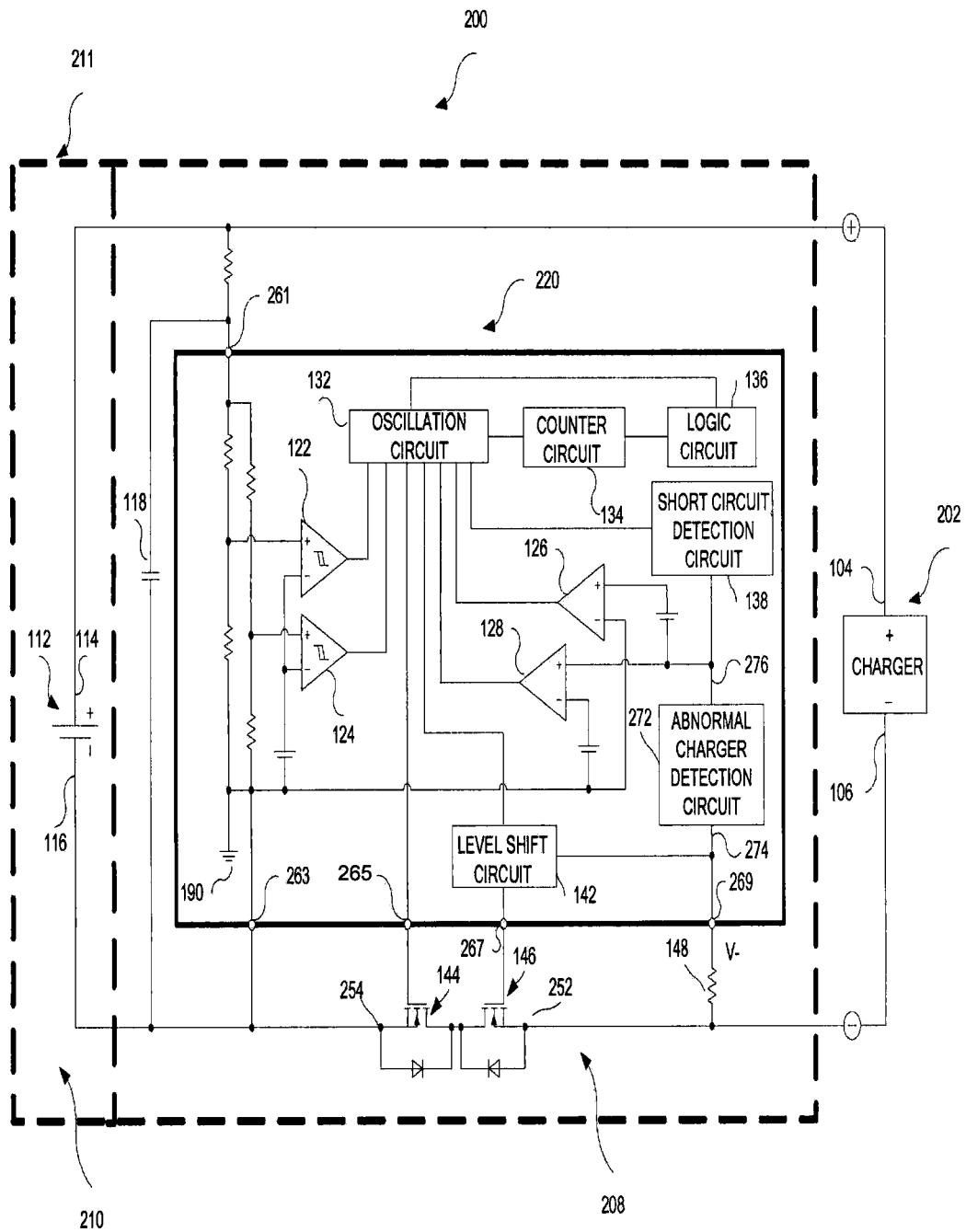
FIG. 2 is a circuit diagram showing another prior-art battery protection system including a battery charge/discharge protection circuit including an abnormal charger detection circuit.

FIG. 2 is a circuit diagram showing a prior-art battery system 200 including a charger 202, a protection system 208, and a battery pack 210. The protection system 208 includes a charge/discharge protection circuit 220, which has five input/output terminals: terminal 261, terminal 263, terminal 265, terminal 267, and terminal 269

As shown in FIG. 2, the system 200 is similar to that of FIG. 1, but includes an abnormal charger detection circuit 272 in the charge/discharge protection circuit 220. The overall structure, functions and operations of the battery pack 210 in system 200 are essentially the same as those of system 100 in FIG. 1, and a description thereof similar components and function will be omitted.

As shown in FIG. 2, an input terminal 274 of the abnormal charger detection circuit 272 is connected to a first terminal 252 through the current limiting resistor 148. An output terminal 276 of the abnormal charger detection circuit 272 is connected to the input terminals of the charge over-current detection circuit 126, discharge over-current detection circuit 128, and the short circuit detection circuit 138.

The abnormal charger detection circuit 272 can detect whether an improper charger 202 is connected thereto and supplying an excessively high voltage to the battery pack 210. When the connection of the improper charger 202 is detected, the abnormal charger detection circuit 272 outputs a detection signal to the input terminals of the charge over-current detection circuit 126, discharge over-current detection circuit 128, and the short circuit detection circuit 138 to cause the battery 112 is disconnected to the charger 202.

Figure 3:
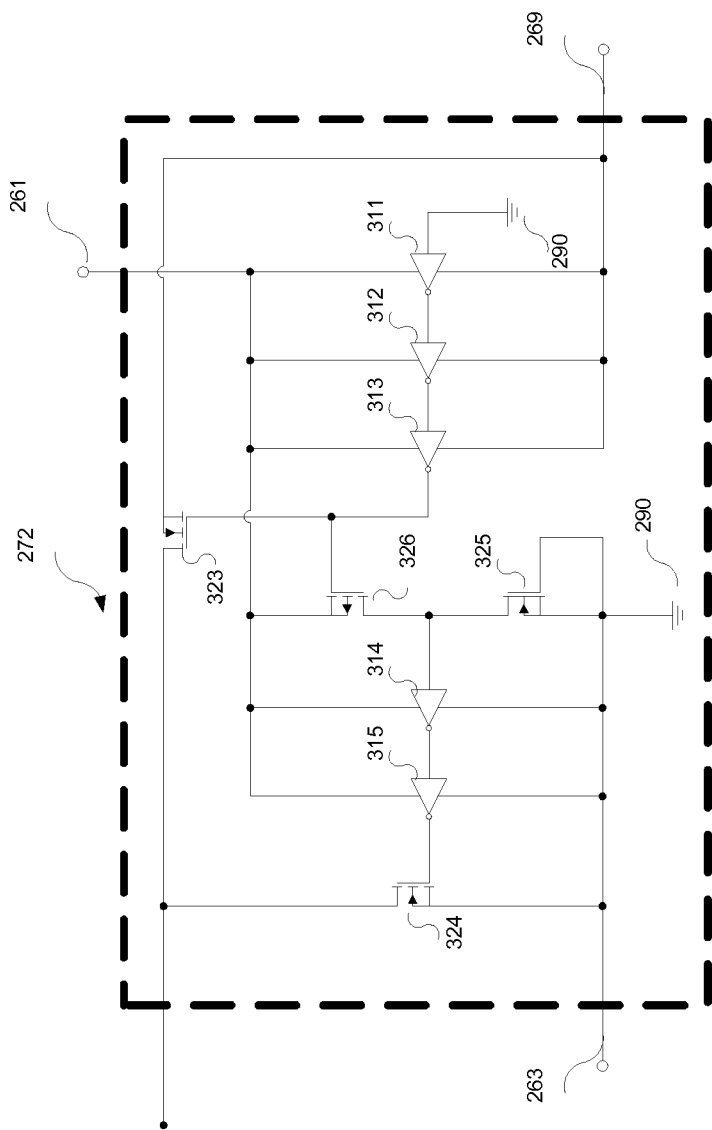
FIG. 3 is a circuit diagram showing a prior-art abnormal charger detection circuit of FIG. 2.

FIG. 3 is a circuit diagram showing the abnormal charger detection circuit 272 of FIG. 2. As shown in FIG. 3, the abnormal charger detection circuit 272 includes a plurality of transistors including a transistor 323, a transistor 324, a transistor 325, and a transistor 326, and a plurality of cascade-connection inverters including an inverter 311, an inverter 312, an inverter 313, an inverter 314, and an inverter 315.

In FIG. 2, similar to the discussion in FIG. 1, the electric potential of the terminal 161 to the terminal 163 is equal to the voltage supplied by the battery 212, $V_{261}-V_{263}=V_{battery}$. The electric potential of the terminal 261 to the terminal 269 is equal to the voltage supplied by the charger 202, $V_{261}-V_{269}=V_{charger}$. Therefore the electric potential of the terminal 263 to the terminal 269 is $V_{263}-V_{269}=V_{charger}-V_{battery}$.

Referring to FIGS. 2 and 3, the input terminal of inverter 311 is connected to the ground 190, the high-level voltage terminal is connected to the terminal 261 and the low-level voltage terminal is connected to the terminal 269. Since the terminal 263 is also connected to the ground 190, the input voltage of the inverter 311 is the electric potential of the terminal 263 to the terminal 269. Since, as discussed before, $V_{263}-V_{269}=V_{charger}-V_{battery}$, $V_{input}=V_{charger}-V_{battery}$. When an improper charger is connected to the battery pack 210 and the voltage of the charger is excessively larger than the voltage of the battery 212, which indicate that the input voltage of the inverter 311 is greater than the threshold voltage $V_{threshold}$, $V_{input}=V_{charger}-V_{battery}>V_{threshold}$. In this situation, the inverter 311 outputs a low-level signal to the inverter 312. The inverter 312 then outputs a high-level signal to the inverter 313 and the inverter 313 then outputs a low-level signal to each of the gate electrode of the transistor 323 and the transistor 326. After receiving this low-level signal, the transistor 323 is turned OFF and the transistor 326 is turned ON. As a result, the connections between the terminal 269 and the charge over-current detection circuit 126, discharge over-current detection circuit 128, and the short circuit detection circuit 138, are cut off. Therefore, the abnormal charger detection circuit 272 protects the battery pack 210 from connecting an improper charger 202. As is shown in FIG. 3, however, the abnormal charger protection circuit 272 needs to be built with high-voltage resistant transistors, which again, cause the same problem as discussed in FIG. 1.

Figure 4:
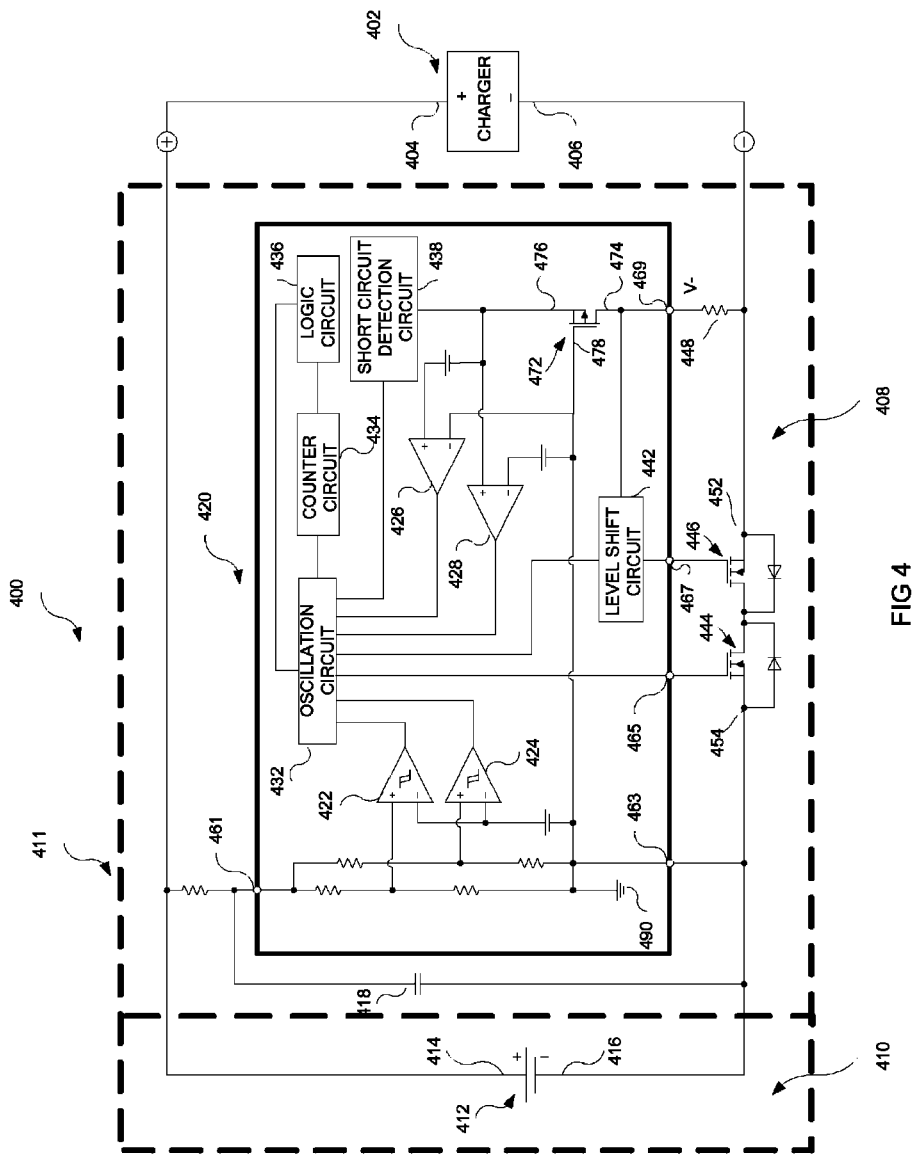
FIG. 4 is a circuit diagram showing a battery protection system in accordance with the present invention.

FIG. 4 is a circuit diagram showing a battery system 400 in accordance with the present invention. The system 400 includes a charger 402, a protection system 408, and a battery pack 410. As illustrated, the battery pack 410 and battery protection system 408 may be coupled together, such as in a common housing 411. However, in other configurations, the battery pack 410 may be removably engaged with the battery protection system 408.

The battery pack 410 includes a rechargeable battery 412, a capacitor 418, a charger control transistor 446, a discharge control transistor 444, and a charger/discharge protection circuit 420. A source electrode of the charge control transistor 446 is a first terminal 452 of the protection circuit 420, and a source electrode of the discharge control transistor 444 is a second terminal 454 of the protection circuit 420. When the battery 412 is being charged, the negative electrode 406 of the charger 402 is connected to the first terminal 452, the negative electrode 416 of the battery 412 is connected to the second terminal 454, and the positive electrode 404 of the charger 402 is connected to the positive electrode 414 of the battery 412.

The battery charge/discharge protection circuit 420 includes an overcharge detection circuit 422, an over-discharge detection circuit 424, a charge over-current detection circuit 426, a discharge over-current detection circuit 428, an oscillation circuit 432, a counter circuit 434, a logic circuit 436, a short circuit detection circuit 438, a level shift circuit 442, and a P-channel MOS field-effect transistor ("PMOS transistor") 472.

In FIG. 4, the charge/discharge protection circuit 420 has five input/output terminals: terminal 461, terminal 463, terminal 465, terminal 467, and terminal 469. The electric potential of the terminal 461 to the terminal 463 is equal to the voltage supplied by the battery 412, $V_{461}-V_{463}=V_{battery}$. The electric potential of the terminal 461 to the terminal 469 is equal to the voltage supplied by the charger 402, $V_{461}-V_{469}=V_{charger}$. If an excessively voltage is supplied by the charger 402 to the battery pack 410, the potential of terminal 469 is lower than the potential of the terminal 463, since the positive electrode 404 of the charger 402 and the positive electrode 444 of the battery 412 are both connected to the terminal 461, $V_{463}-V_{469}=V_{charger}-V_{battery}$.

When a voltage supplied to the battery 412 is detected to be higher than a predetermined maximum or desired voltage, the charge/discharge protection circuit 420 turns off the charge control transistor 446 such as to cut off the connection between the negative electrode 406 of the charger 402 and the negative electrode 416 of the battery 412.

In this situation, the electric potential of the drain electrode 474 of the PMOS transistor 472 is equal to $V_{469}$. As discussed above, since $V_{463}-V_{469}=V_{charger}-V_{battery}$, and the terminal 463 is connected to the ground 490, the electric potential of the drain electrode 474 is $V_{474}=V_{battery}-V_{charger}$. With this electric potential of the drain electrode 474, based on the characteristics of PMOS transistor, the electric potential of the source electrode 476 of the PMOS transistor 472 is above the negative value of its threshold voltage, $V_{472}>-V_{threshold}$. Therefore, electric potential of the input terminal of the charge over-current detection circuit 426, the discharge over-current detection circuit 428, and the short circuit detection circuit 438 are above the negative value of the threshold voltage of the PMOS transistor 472. Hence, different from the charge/discharge protection circuit 120 in FIG. 1 and the charge/discharge protection circuit 220 in FIG. 2, the charge over-current detection circuit 426, the discharge over-current detection circuit 428, and the short circuit detection circuit 438 in the charge/discharge protection circuit 420 in present invention are not subjected to the high voltage provided by an abnormal charger and can be built with low-voltage resistant transistors. This not only reduces the chip area and manufacturing cost, but also avoids exposing the transistors in high voltage electric field.

It should be noted that the PMOS transistor provided in present invention is a depletion PMOS transistor, where a drain electrode of the PMOS transistor can withstand negative voltage.

The present invention provides a charge/discharge protection circuit that does not require high-voltage resistant elements. When a voltage above an overvoltage threshold is supported by the charger, the voltage of the source electrode of the PMOS transistor is maintained above a negative threshold voltage and the elements in the charge/discharge protection circuit do not receive such a voltage output by the charger. Therefore low-voltage resistant elements can be used in the protection circuit such as to save the chip area and manufacturing cost.

What is claimed is:

1. A battery charge/discharge protection circuit configured to protect the battery from charge/discharge damage, the protection circuit comprising:
    a first terminal configured to be connected to a negative electrode of a charger;
    a second terminal configured to be connected to a negative electrode of a rechargeable battery, wherein a positive electrode of the charger is configured to be connected to a positive electrode of the rechargeable battery;
    a charge over-current detection circuit including a plurality of transistors;
    a discharge over-current detection circuit including a plurality of transistors;
    a short circuit detection circuit including a plurality of transistors;
    a p-channel metal-oxide-semiconductor field-effect (PMOS) transistor,
        wherein a drain electrode of the PMOS transistor is connected to the first terminal, a gate electrode of the PMOS transistor is connected to the second terminal, and a source electrode of the PMOS transistor is connected to the charge over-current detection circuit, the discharge over-current detection circuit, and the short circuit detection circuit;
    wherein when a voltage above an overvoltage threshold is output by the charger, the voltage of the source electrode of the PMOS transistor is maintained above a negative threshold voltage, such that the transistors of the charge over-current detection circuit, the discharge over-current detection circuit and the short circuit detection circuit do not receive the voltage above the overvoltage threshold output by the charger.

2. The protection circuit of claim 1 wherein the PMOS transistor is a depletion PMOS transistor, wherein the drain electrode of the depletion PMOS transistor is resistant to negative high voltage.

3. A battery system comprising:
    a rechargeable battery; and
    a charge/discharge protection circuit coupled to the rechargeable battery, comprising:
    a first terminal configured to be connected to a negative electrode of a charger;
    a second terminal configured to be connected to a negative electrode of the rechargeable battery, wherein a positive electrode of the charger is configured to be connected to a positive electrode of the rechargeable battery;
    a charge over-current detection circuit including a plurality of transistors;
    a discharge over-current detection circuit including a plurality of transistors;
    a short circuit detection circuit including a plurality of transistors;
    a p-channel metal-oxide-semiconductor field-effect (PMOS) transistor,
        wherein a drain electrode of the PMOS transistor is connected to the first terminal, a gate electrode of the PMOS transistor is connected to the second terminal, and a source electrode of the PMOS transistor is connected to the discharge over-current detection circuit, the charge over-current detection circuit, and the short circuit detection circuit;
    wherein when a voltage above an overvoltage threshold is output by the charger, the voltage of the source electrode PMOS transistor is maintained above a negative threshold voltage, such that the transistors of the charge over-current detection circuit, the discharge over-current detection circuit and the short circuit detection circuit do not receive the voltage above the overvoltage threshold output by the charger.

4. The battery system of claim 3 wherein the PMOS transistor is a depletion PMOS transistor, wherein the drain electrode of the depletion PMOS is resistant to negative high voltage.

* * * * *